April 9, 1946.   J. E. DUNHAM   2,398,137
OPHTHALMIC MOUNTING
Filed May 18, 1944   2 Sheets-Sheet 1
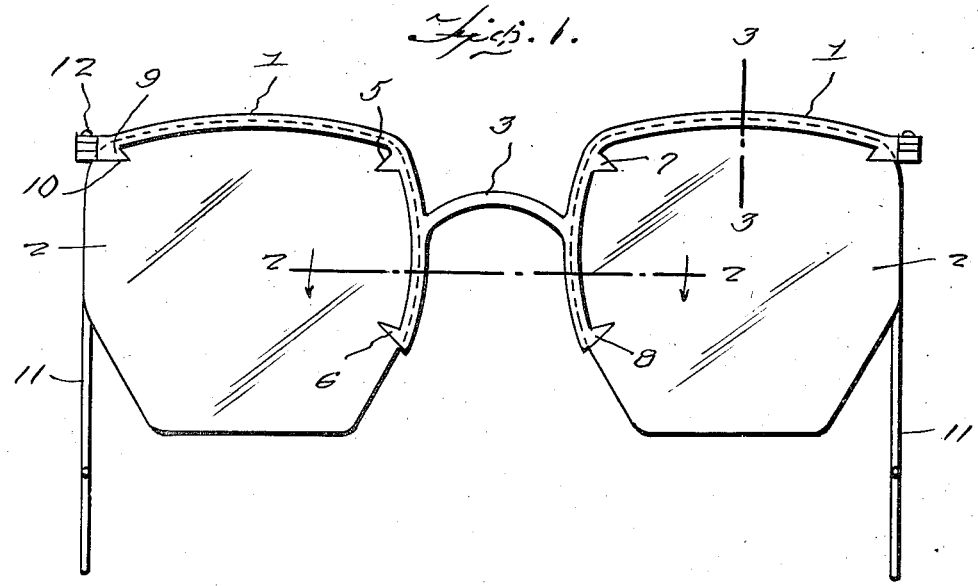
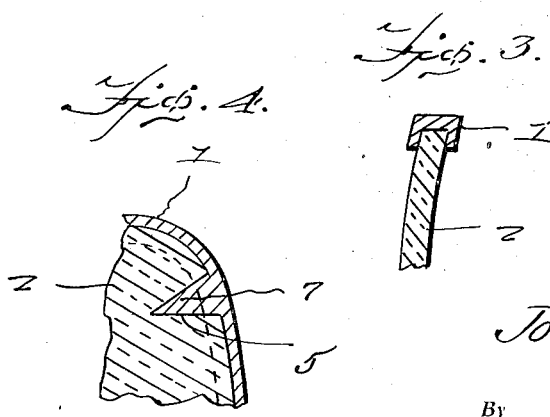
Inventor
Joseph E. Dunham
By Clarence A. O'Brien
and Harvey B. Jacobson
Attorneys April 9, 1946.  J. E. DUNHAM  2,398,137
OPHTHALMIC MOUNTING
Filed May 18, 1944   2 Sheets-Sheet 2
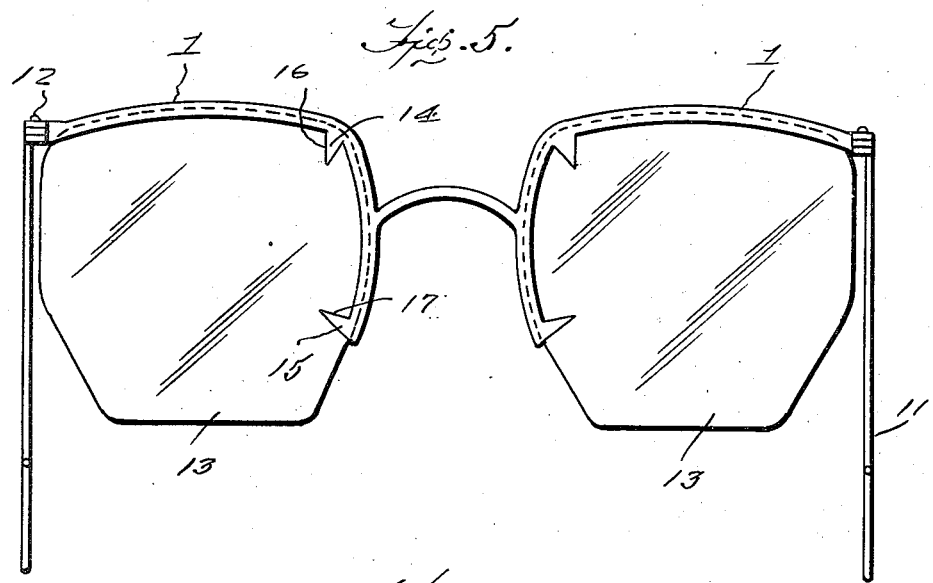
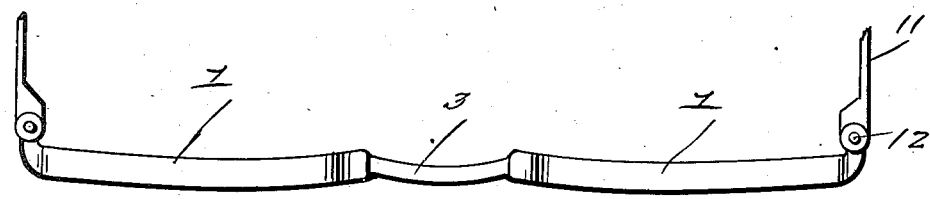
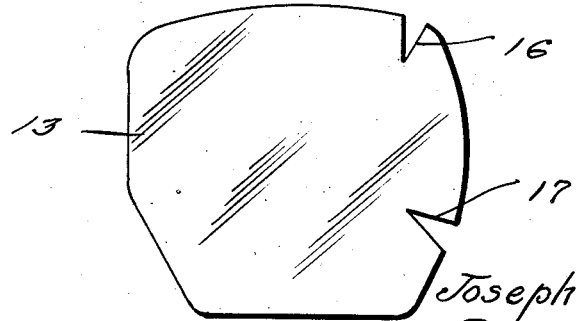
Inventor
Joseph E. Dunham
By Clarence A. O'Brien
and Harvey B. Jacobson
Attorneys Patented Apr. 9, 1946

2,398,137

UNITED STATES PATENT OFFICE 2,398,137

OPHTHALMIC MOUNTING

Joseph E. Dunham, Charleston, S. C.

Application May 18, 1944, Serial No. 536,173

1 Claim. (Cl. 88—47)

My invention relates to improvements in ophthalmic mountings for eyeglasses, the primary object in view being to provide a pair of lenses with a semi-rimless mounting whereby the lenses are securely held in place without resorting to drilling the same, or to the use of screws, and which is easy to apply, safe, strong, and comparatively inexpensive to manufacture.

Other and subordinate objects are also comprehended by my invention, all of which, together with the precise nature of my improvements, will be readily understood when the succeeding description and claim are read with reference to the drawings accompanying and forming part of this specification.

In said drawings:

Figure 1 is a view in front elevation illustrating my improved ophthalmic mounting in the preferred embodiment thereof, Figure 2 is a view in longitudinal section taken on the line 2—2 of Figure 1 and drawn to an enlarged scale, Figure 3 is a view in vertical transverse section taken on the line 3—3 of Figure 1 and drawn to an enlarged scale, Figure 4 is a view in vertical section taken through the upper inner corner of one of the lenses and one of the rim members, Figure 5 is a view in front elevation of a modified embodiment of the invention, Figure 6 is a view in plan of the same, Figure 7 is a view of one of the lenses of the modified embodiment of my invention.

Referring to the drawings by numerals, and first to Figures 1 to 4, my improved ophthalmic mounting in the preferred embodiment thereof has been shown as applied to a pair of polygonal drop-type lenses, and as applied to such lenses comprises a pair of substantially right angled rim members 1 adapted to extend along the top edges of the lenses 2 and part way down the inner side edges of the lenses, said members being connected by a nose bridge, as at 3, formed integrally with the rim members 1 intermediate the angles of said members and the lower ends of the same. The rim members 1 are channeled, as at 4, to seat the opposed edges of the lenses 2 therein. The lenses 2, at the inner side edges thereof, are each provided with a pair of upper and lower V notches 5, 6, one at the upper inner corner of the lens, and the other part way down the inner side edge of the lens, and the rim members 1 are provided with a pair of upper and lower V-shaped prongs 7, 8, one adjacent the angle portion of the rim member, and the other at the lower end of the same, and which fit in said notches. A similar prong 9 is provided at the outer end of each rim member 1, and each lens 2 is provided in the upper, outer corner thereof with a V notch 10 in which the appropriate prong 9 fits.

As best shown in Figure 1, the upper notches 5 and the prongs 7 are arranged to converge downwardly, relatively, so that said notches and prongs firmly hold the lenses 2 in place at the top of the glasses. The upper notches 5 and prongs 7, and the lower notches 6 and prongs 8 converge, relatively, to securely hold the lenses 2 in place at the inner side edges of said lenses.

The temple bows 11 are pivoted, as at 12, to the outer ends of the rim members 1 in the usual manner.

In the modified embodiment shown in Figures 5, 6 and 7, the notches at the outer upper corners of the lenses 13 and the corresponding prongs described with reference to the preferred embodiment are eliminated, the lenses 13 being held in place solely by pairs of upper and lower prongs 14, 15 and pairs of upper and lower notches 16, 17 similar to those described previously. Otherwise, the construction and arrangement is the same as in the preferred embodiment of the invention. The modified embodiment of the invention provides a more flexible mounting than the preferred embodiment.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claim.

What I claim is:

In combination, a pair of lenses, a frame comprising a pair of substantially right angled rim members extending along the top edges of said lenses and part way down the inner side edges thereof, a pair of upper and lower V-shaped prongs at the angles of said members and the lower ends thereof, respectively, extended into the inner side edges of the lenses and converging, relatively, from said members, and a V-shaped prong on the outer end of each member extended into the outer upper corner of the lens and converging toward the upper prong of the pair on the member, said lenses having V-shaped notches therein for receiving said prongs.

JOSEPH E. DUNHAM.